Oct. 10, 1944.    J. MIHALYI    2,360,255
AUTOMATIC FILM WINDING MECHANISM
Filed Feb. 13, 1942    2 Sheets-Sheet 1

JOSEPH MIHALYI
INVENTOR

BY
ATTORNEYS

Patented Oct. 10, 1944

2,360,255

UNITED STATES PATENT OFFICE 2,360,255

AUTOMATIC FILM WINDING MECHANISM

Joseph Mihalyi, Rochester, N. Y., assignor to Eastman Kodak Company, Rochester, N. Y., a corporation of New Jersey Application February 13, 1942, Serial No. 430,790

9 Claims. (Cl. 242—71)

This invention relates to photography and more particularly to photographic apparatus in which roll film may be propelled in one direction manually and may be automatically propelled in the opposite direction by power. One object of my invention is to provide a device in which positioning the film in the photographic apparatus will automatically provide a sufficient spring tension to propel the film through the apparatus. Another object of my invention is to provide photographic apparatus which is simple to construct and easy to manipulate. Still another object of my invention is to provide an automatic film winding system which reduces the operations usually necessary in moving film through a camera, projector, printer or the like. Other objects will appear from the following specification, the novel features being particularly pointed out in the claims at the end thereof.

Coming now to the drawings wherein like reference characters denote like parts throughout:

Figure 1:
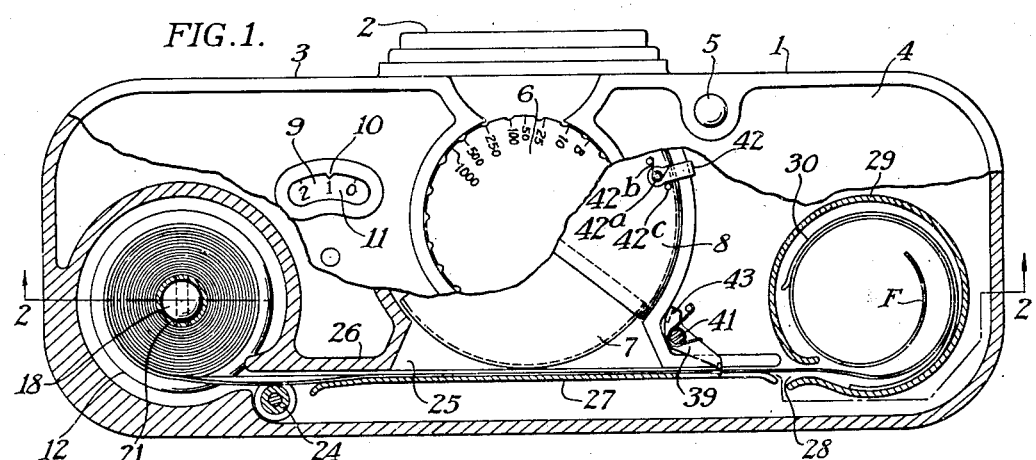
Fig. 1 is a plan view partially in section of a camera constructed in accordance with and embodying a preferred embodiment of my invention.
Figure 2:
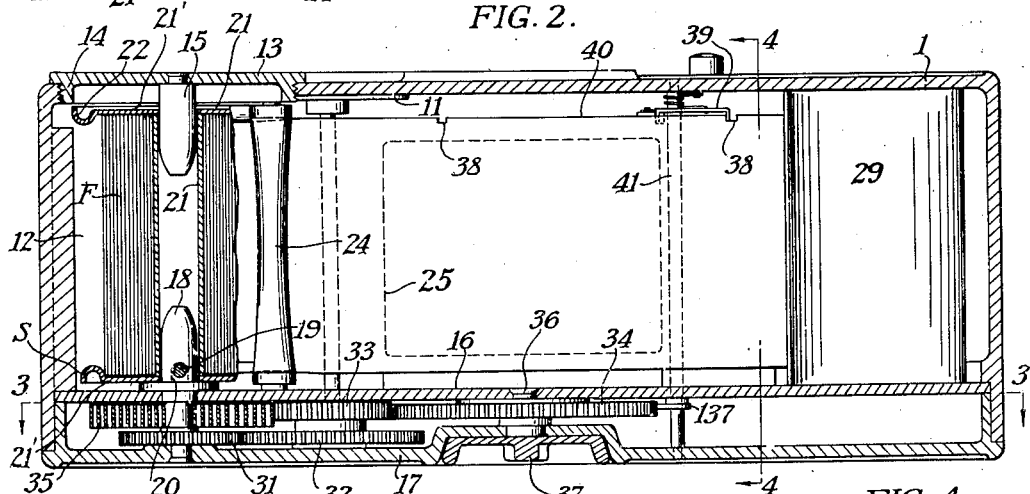
Fig. 2 is a longitudinal section through the camera shown in Fig. 1, the section being taken on line 2—2.

Broadly speaking, my invention comprises a spring motor attached to photographic apparatus to which a spool of film may be applied, there being a manually operable member for simultaneously unwinding the film from the spool, passing it through the apparatus and winding up a spring motor by this operation so that the film may be returned to the spool through the power stored in the spring motor.

In the first embodiment of my invention the camera may consist of a camera body 1 having an objective mounted in a suitable lens barrel 2 on the front wall 3 of the camera. The top wall 4 of the camera may carry a trigger member 5 for operating a suitable shutter and a dial 6 which may be set to determine the extent of an exposure which in the present instance may be made through the shutter blades 7 and 8 which may be operated by any suitable mechanism.

The top wall 4 likewise carries a window 9 and a pointer 10 so that a dial 11 may indicate the number of exposures made, this dial being operated by a suitable mechanism not forming a part of the present invention.

Inside of the camera body there is a supply spool chamber 12 which may be covered by a top cap 13 carried by the top wall 4 of the camera in a suitable member as by a threaded connection at 14. This top cover may include a spool centering pin 15 and a wall 16 near the bottom wall 17 of the camera may rotatably support a post 18 carrying a winding pin 19 adapted to engage in a slot 20 in the end of a hub 21 of a film spool designated broadly as S.

This film spool is of the type having flanges 21', the peripheries of which 22 are spaced closer together than the width of the film F, thus the flanges normally hold the film against unwinding, but when the film is curved transversely as by the curved roller 24 which is of smaller diameter in the center than it is at the ends, the film may pass freely from the spool chamber 12 and may be moved across an exposure aperture 25 and through a guideway formed by the camera walls 26 and the plate 27 which may be fixedly mounted so as to direct the end of the film to an opening 28 in a take-up film chamber 29 which may consist of a substantially cylindrical member preferably equipped with a leaf spring 30 to assist the film F in coiling in a loose coil in this chamber.

Between the walls 16 and 17 I prefer to provide a spring motor in which a series of gears 31, 32, 33 and 34 are connected to provide a gear retard so that a spring 35 will drive the film spool S at a reasonable or desirable speed.

Figure 3:
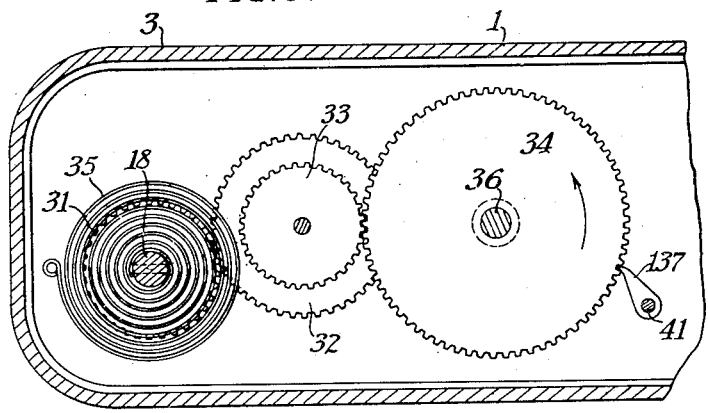
Fig. 3 is a fragmentary bottom section taken on line 3—3 of Fig. 2.
Figure 4:
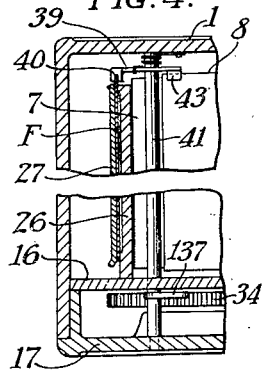
Fig. 4 is a fragmentary section taken on line 4—4 of Fig. 2.

On shaft 36 which supports the gear 34, I provide a winding handle 37 which is adapted to serve two functions, that is after a film has been loaded into the chamber 12 the film by means of the handle 37 may be wound into the take-up film chamber 29 by turning the handle so that the gear 34 will rotate in the direction shown in Fig. 3 and so that the film spool S will be turned in a counterclockwise direction with respect to Fig. 1. A pawl 137 prevents the spring 35 from returning the film to the film spool during this operation since of course the spring 35 is tensioned as the film is unwound.

In the present instance the film F is provided with a series of notches 38, one for each exposure area and these notches may be engaged by a feeler arm 39 spring pressed into engagement with the edge 40 of the film or into engagement with the film notches 38. This arm may be actuated with a supporting post 41 and may be lifted from a notch 38 by means of a protuberance 42 on the second shutter blade 8 as the blade returns to its initial position of rest after making an exposure.

In other words, when the trigger 5 is depressed to make an exposure, and the second shutter blade 8 swings about its center, the protuberance 42 will swing in its pivot 42a against the pressure of spring 42b and will not raise the downwardly formed lug 43 on the feeler arm 39. But when the blade returns after an exposure it may not swing on its pivot because of pin 42c. It will raise arm 39 releasing it from the notch 38 so that the spring motor 35 will immediately start to wind the film on the spool S. This can occur since pawl 137 is also moved from the teeth of gear 34. The feeler arm 39 is immediately released so that it may ride on the edge 40 of the film until such a time as a notch 38 comes opposite the end of the feeler arm 39 at which time it will move downwardly so that the pawl 137 also carried by the rod 41 will be permitted to drop into a tooth of the gear 34 at the same time the feeler arm drops into the notch 39. This automatically stops further winding of the film until the shutter is again actuated. This operation may be repeated until all of the film is exposed at which time it will be returned to the film spool S so that an operator may remove the film spool through the cap 13 and reload by dropping another film spool into place. The winding handle 37 will then be turned to both unwind the film and tension the motor to ready the film for a series of exposures.

While my invention is particularly adapted for use on cameras, it is also equally useful for other types of photographic apparatus such as projectors, printers and the like.

Figure 5:
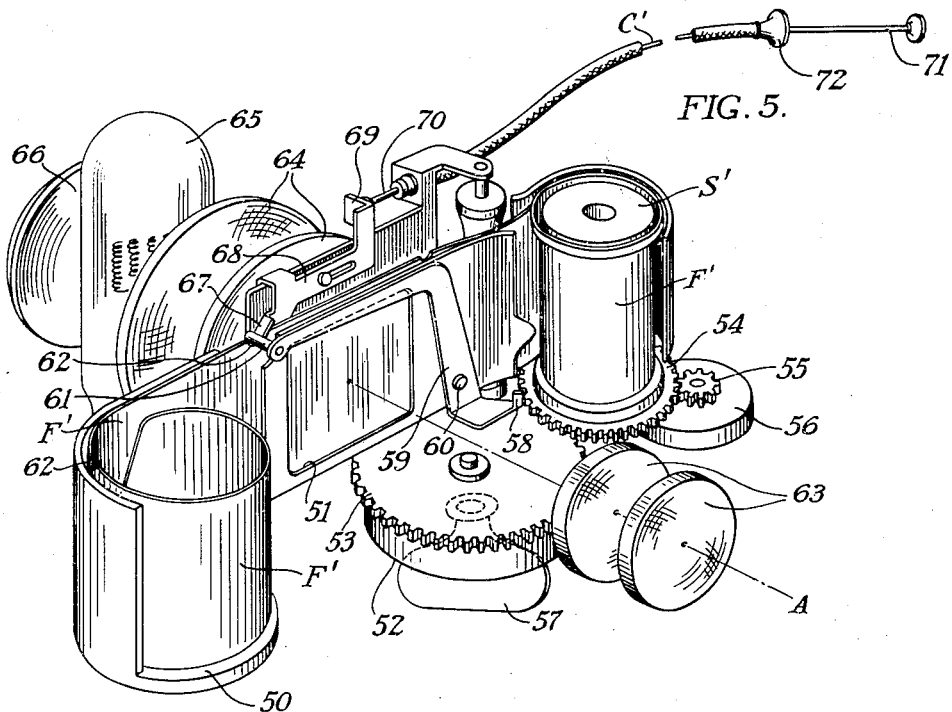
Fig. 5 is a perspective somewhat schematic showing of a second embodiment of my invention in which the automatic film moving mechanism is applied to a projector.

A second embodiment of my invention is shown in Fig. 5 wherein a film is similar in all respects to the film described for the preceding embodiment of my invention except that the film itself may have been developed into a positive for projection as slides.

Here, the film spool S' is provided with a film F' which may be manually unwound into a loose coil on a support 50 so that, by actuating a cable release C' or other suitable release, the film areas may be passed automatically into projecting position in front of a film gate 51 as the film is returned to the original spool S'.

As in the first embodiment of my invention I provide a spring motor consisting of a spring member 52 and gears 53, 54 and 55, the last gear being preferably connected to a speed control governor 56. When the handle 57 is turned to unwind film from the spool S' through the film gate past the exposure frame 51, the spring motor is tensioned and in this instance the spring motor is held in a tensioned position by means of the tooth 58 engaging a tooth of gear 54. The holding tooth 58 may be carried by a bell-crank lever 59 pivoted at 60 and having an arm 61 riding on the edge of the film F in a position to drop into notches 62 provided in the edges. Thus, when the parts are in the position shown in full lines a picture area is held in the frame 51 so that an image may be projected upon a screen by the optics which are diagrammatically illustrated.

The objective may consist of a pair of lens elements 63 which may form an image of a film area held at the exposure frame 51 on any suitable screen. Condenser lenses 64 are customarily provided in front of the projection lamp 65 behind which there is preferably arranged a reflector 66.

In order to release the pin 61 from a film notch 62, I provide a cam 67 carried by a slide 68 having an up-turned end 69 adapted to be moved by the plunger 70 of a cable release. An operator by pressing together the plunger 71 and the finger grip 72 of the cable release will cause the cam 67 to lift the pin 61 out of the film notch 62 and will simultaneously move the bell-crank lever 59 so that the holding tooth 58 will move from a gear tooth of gear 54, thereby enabling the spring motor to wind the next area of film into a projecting position. When the film area reaches the film gate 51 the pin 61 will drop in the next notch 62 and automatically stop movement of the spring motor.

In both of the described embodiments of my invention I provide a winding and reeling mechanism in which the unwinding of the film from a spool to which it is attached automatically places a sufficient tension in a spring motor to rewind the film upon the original spool, thus reducing the usual operations necessary in threading and winding a film through photographic apparatus. While I have described two preferred embodiments of my invention, it is obvious that different embodiments can readily be made without departing from the scope of my invention as defined in the following claims.

What I claim and desire to be secured by Letters Patent of the United States is:

1. In photographic apparatus adapted for use with a single film spool containing film including cutouts therein, the combination with a body, of an exposure frame therein, a supply film chamber, a takeup film chamber, a spring motor, a film spool engaging member connected to be rotated by the spring motor, a film winding key, direct connections between the film winding key and the spring motor, the film spool engaging member being operable by either the winding key or by the spring motor, said winding key simultaneously unwinding film from the supply chamber into the takeup chamber and winding up the spring motor, a ratchet operated by the spring motor, a pawl positioned to engage the ratchet, and means for controlling the position of the pawl relative to the ratchet including an arm normally engaging the film and positioned to engage said cut outs in the film to stop the motor drive.

2. In photographic apparatus for winding film to and from a single film spool and having cut outs therein past an exposure aperture and including in combination, a body, a spool chamber therein, means in the spool chamber for drivingly engaging said film spool, connections to said means and a manually operable handle and a spring power drive, said handle unwinding film from a spool in the spool chamber and simultaneously winding up said spring motor, a control for the spring motor including a two-ended pivoted lever, said film and the cut outs therein controlling one end of the lever, the opposite end thereof being positioned to move into the path of a spring motor element to prevent operation thereof.

3. In photographic apparatus for winding film to and from a single film spool and having cut outs therein past an exposure aperture and including in combination, a body, a spool chamber therein, means in the spool chamber for drivingly engaging said film spool, connections to said means and a manually operable handle and a spring power drive, said handle unwinding film from a spool in the spool chamber and simultaneously winding up said spring motor, a control for the spring motor including a two-ended pivoted lever, said film and the cut outs therein controlling one end of the lever, the opposite end thereof being positioned to move into the path of a spring motor element to prevent operation thereof, and mechanism carried by the body for manually moving the lever from its position preventing movement of the spring motor.

4. In photographic apparatus for winding film to and from a single film spool and having cut outs therein past an exposure aperture and including in combination a body, a spool chamber therein, means in the spool chamber for drivingly engaging said film spool, connections to said means and a manually operable handle and a spring power drive, said handle unwinding film from a spool in the spool chamber and simultaneously winding up said spring motor, said motor including a gear rotating with the means for drivingly engaging the film spool, a motor control including a pivoted bell crank lever, one end of the bell crank lever riding on the film and adapted to move into the cut outs therein, the other end of the lever swinging to and from a motor blocking position in engagement with a tooth of the gears moving with the means for drivingly engaging the film spool, whereby each time the bell crank lever engages a film cut out the lever may block further operation of the spring motor.

5. In photographic apparatus for winding film to and from a single film spool and having cut outs therein past an exposure aperture and including in combination a body, a spool chamber therein, means in the spool chamber for drivingly engaging said film spool, connections to said means and a manually operable handle and a spring power drive, said handle unwinding film from a spool in the spool chamber and simultaneously winding up said spring motor, said motor including a gear rotating with the means for drivingly engaging the film spool, a motor control including a pivoted bell crank lever, one end of the bell crank lever riding on the film and adapted to move into the cut outs therein, the other end of the lever swinging to and from a motor blocking position in engagement with a tooth of the gears moving with the means for drivingly engaging the film spool, whereby each time the bell crank lever engages film cut out the lever may block further operation of the spring motor, and means movably mounted with respect to the bell crank lever for swinging said lever from a film cut out and from a gear engaging position to release the spring motor for film driving movement.

6. In photographic apparatus of the type receiving only a single film spool, the combination with a support, of an exposure frame carried by the support, a spool chamber, a film spool support carried thereby to drivingly engage a spool of film, a film chamber into which film may be wound in a loose coil, manually operated means for turning the film spool in one direction, a spring motor, mechanical connections between the spring motor and the manually operated means for tensioning the motor when the spool is rotated in one direction by the manually operable means, and a motor control operable to wind the film spool by the spring motor in an opposite direction whereby film may be manually moved in one direction and moved in an opposite direction by the spring motor tensioned by manually moving the film.

7. In photographic apparatus of the type receiving only a single film spool, the combination with a body, of an exposure frame therein, a supply film chamber, a take-up film chamber into which film may be wound in a loose coil, a spring motor, a single film spool engaging member connected to be rotated by the spring motor, a film winding key, means carried thereby for engaging a spool of film, direct connections between the film winding key and the spring motor for simultaneously unwinding film from the supply chamber into a loose coil in the take-up chamber and winding up the spring motor.

8. In photographic apparatus, the combination with a support, of a chamber to receive a single spool of film carried by the support, a second film chamber to receive a loose coil of unsupported film, means for drivingly engaging the film spool in the spool chamber, a manual drive and a spring motor power drive, mechanical connections between said manual drive and said spring motor power drive and the means for drivingly engaging the film spool, the connections between said manual and power drives being such that unwinding the film from said film spool by the manual drive forces film into the second chamber in a loose coil and tensions the spring of the power drive, whereby said power drive may wind film from the loose coil onto said film spool after said film is unwound therefrom.

9. In photographic apparatus for winding film having cutouts therein and carried by a single film spool past an exposure aperture and including in combination, a body, a spool chamber therein, a film chamber to receive a loose coil of film, means in the spool chamber for drivingly engaging a film spool, a manually operable handle and a spring power drive, direct connections between said manually-operable handle, said spring power drive and said means in the spool chamber for drivingly engaging the film spool, said handle unwinding film from a spool in the spool chamber, forcing film into the film chamber in a loose coil, and simultaneously winding up said spring motor in proportion to the film unwound from said spool whereby energy may be stored up in said motor to wind up the manually unwound and loosely coiled film.

JOSEPH MIHALYI.